US008475758B2

(12) United States Patent
Laine et al.

(10) Patent No.: US 8,475,758 B2
(45) Date of Patent: Jul. 2, 2013

(54) LOW COST ROUTES TO HIGH PURITY SILICON AND DERIVATIVES THEREOF

(75) Inventors: Richard M. Laine, Ann Arbor, MI (US); David James Krug, Ann Arbor, MI (US); Julien Claudius Marchal, Ann Arbor, MI (US); Andrew Stewart Mccolm, Ann Arbor, MI (US)

(73) Assignee: Mayaterials, Inc., Ann Arbor, MI (US)

( * ) Notice: Subject to any disclaimer, the term of this patent is extended or adjusted under 35 U.S.C. 154(b) by 120 days.

(21) Appl. No.: 13/057,058

(22) PCT Filed: Aug. 6, 2009

(86) PCT No.: PCT/US2009/052965
§ 371 (c)(1),
(2), (4) Date: May 2, 2011

(87) PCT Pub. No.: WO2010/017364
PCT Pub. Date: Feb. 11, 2010

(65) Prior Publication Data
US 2011/0206592 A1   Aug. 25, 2011

Related U.S. Application Data

(60) Provisional application No. 61/086,546, filed on Aug. 6, 2008.

(51) Int. Cl.
*C01B 33/02* (2006.01)
(52) U.S. Cl.
USPC .......................................... 423/350; 423/348
(58) Field of Classification Search
USPC .......................................... 423/335, 348–350
See application file for complete search history.

(56) References Cited

U.S. PATENT DOCUMENTS

| 4,006,284 A | * | 2/1977 | Segsworth et al. ............ 373/19 |
| 4,214,920 A | | 7/1980 | Amick et al. |
| 4,460,556 A | | 7/1984 | Aulich et al. |
| 2006/0089258 A1 | * | 4/2006 | Hinman et al. ............... 502/413 |
| 2007/0217988 A1 | | 9/2007 | Amendola |

FOREIGN PATENT DOCUMENTS

JP   2005097004 A   *   4/2005

OTHER PUBLICATIONS

Hunt et al., "Rice Hulls as a Raw Material for Producing Silicon", J. Electrochem. Soc. vol. 131, No. 7, pp. 1683-1686. Jul. 1984.*
Patel et al., "Effect of thermal and chemical treatments on carbon and silica contents in rice husk", Journal of Materials Science 22 (1987), 2457-2464.*
Sun et al., "Silicon-Based Materials from Rice Husks and Their Applications", Ind. Eng. Chem. Res. 2001, 40, 5861-5877.*
Amick, J. A., Purification of Rice Hulls as a Source of Solar Grade Silicon for Solar Cells. J. Electrochem. Soc.: Solid-State Science and Technology. Apr. 1982, vol. 129, No. 4, pp. 864-866.
Office Action for Korean Patent Application 10-2011-7005049, Patent Office for Korea, Feb. 26, 2013.

* cited by examiner

*Primary Examiner* — Anthony J Zimmer
(74) *Attorney, Agent, or Firm* — Kubotera & Associates LLC (57) ABSTRACT

The present invention is directed to a method for providing an agricultural waste product having amorphous silica, carbon, and impurities; extracting from the agricultural waste product an amount of the impurities; changing the ratio of carbon to silica; and reducing the silica to a high purity silicon (e.g., to photovoltaic silicon).

19 Claims, 7 Drawing Sheets

LOW COST ROUTES TO HIGH PURITY SILICON AND DERIVATIVES THEREOF

CLAIM OF PRIORITY

This application claims the benefit of the filing date of U.S. Provisional Application No. 61/086,546 filed on Aug. 6, 2008, incorporated herein by reference in its entirety.

STATEMENT REGARDING FEDERALLY SPONSORED RESEARCH OR DEVELOPMENT

The invention was made in part with Government support under National Science Foundation Award No. IIP-0740215 and under the U.S. Department of Energy Contract No. DE-FG36-08G018009. The Government has certain rights to the invention.

FIELD OF THE INVENTION

The present invention pertains to silicon, and more particularly, to high purity silicon, such as derived using silica from agricultural waste products.

BACKGROUND OF THE INVENTION

Energy independence is a modern priority driven both by anticipated climatic changes due to global warming and ever-increasing reliance on imported hydrocarbon derived energy sources. The need for renewable, clean and abundant energy sources is obvious from the likes of solar energy, especially from silicon photovoltaics (PVs), which is high on the list. A factor preventing the more rapid adoption of silicon PVs is their current high cost driven in part by limited supplies of the photovoltaic grade silicon (i.e., "$Si_{pv}$") used to manufacture monocrystalline or polycrystalline wafers.

Although silicon is the second most abundant element in the earth's surface, highly purified silicon needed to make PV cells is expensive because of the energy intensive, complex, and costly processes currently used in its manufacture. The large capital costs involved means that $Si_{pv}$ production takes years to ramp up. In 2006, the demand, by volume, for $Si_{pv}$ exceeded the demand for semiconductor or electronics grade silicon (i.e., "$Si_{eg}$") for the first time. The few companies manufacturing $Si_{pv}$ are currently unable to meet growing customer demand thereby reducing the potential for rapid growth in solar energy.

All grasses (wheat, rice, barley, oats, etc.) take up $SiO_2$, depositing significant amounts in their stalks and seed hulls with minimal incorporation of the standard impurities found in "high purity quartz." Thus the plants naturally pre-purify the silica incorporated in their structure. For example, rice hulls have the high silica contents for these grasses.

Many $Si_{pv}$ and $Si_{eg}$ manufacturers rely on what is known as the Siemens Si purification process (i.e., "the quartz rock purification process") and modifications thereof. This process involves multiple steps starting from quartz rock and carbon sources to produce metallurgical grade Si (i.e., "$Si_{mg}$"). $Si_{mg}$ is further processed to produce corrosive, toxic, and potentially polluting chlorosilanes that are then subject to several high-energy steps to produce $Si_{eg/pv}$.

Currently a large majority of Si compounds may be produced from $Si_{mg}$, which may be produced by carbothermal reduction of silica (equation 1) in a relatively high temperature (e.g., greater than about 1500° C.), relatively high capital equipment and relatively high energy intensive process, (e.g., equations 1-3). The much higher purity required for electronic ($Si_{eg}$) and photovoltaic ($Si_{pv}$) grade silicon, requires additional processing steps as those typically utilized in the Siemens process (and related modifications), such as the steps described by equations (4)-(6). The reactions described by equations (4)-(6) will generate considerable $SiCl_4$, HCl, $Cl_2$ or any combination thereof as byproducts, which may have limited uses. It is further believed that it may be possible to recycle HCl, $SiCl_4$, or both with little loss. Nonetheless, because chlorosilanes, $Cl_2$ and HCl gases are corrosive, toxic, and polluting, the production processes require expensive and extensive environmental controls or other safeguards, which may add to the overall cost of the materials.

(equation 1)

(equation 2)

(equation 3)

(equation 4)

(equation 5)

(equation 6)

Figure 1:
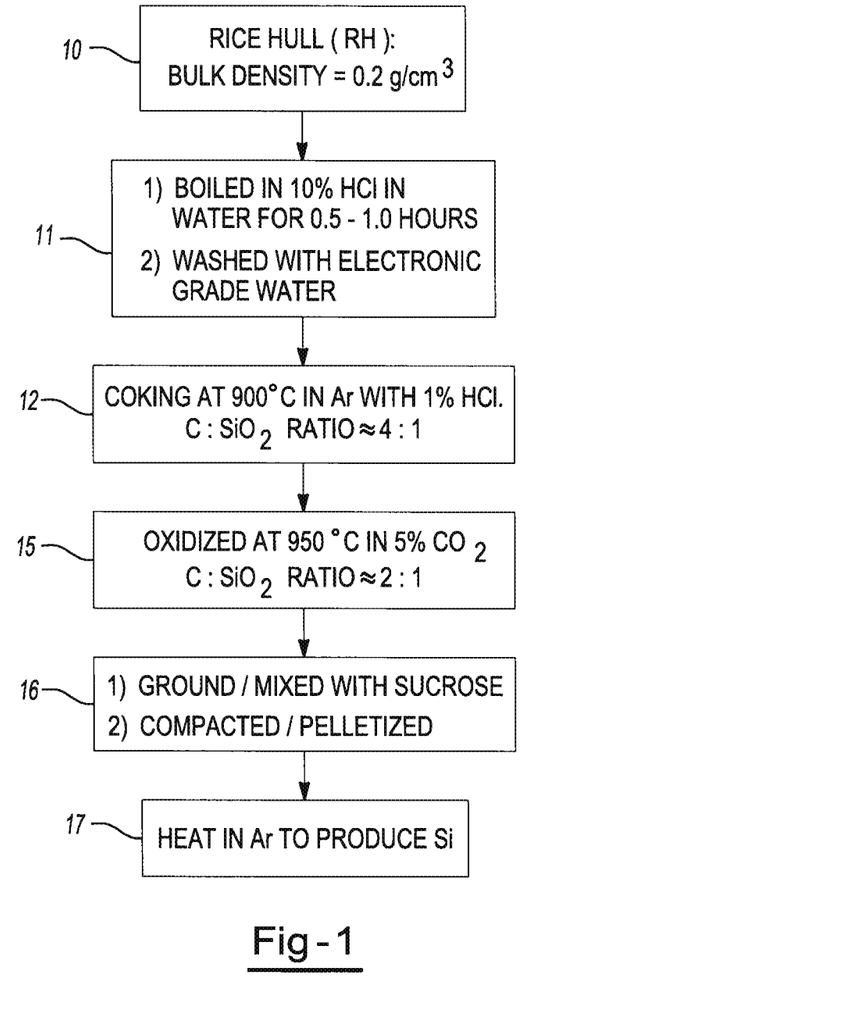
FIG. 1 illustrates a flow chart of a process from the prior art.

As such, there remains a need in the art to continue to find alternative ways to produce high purity silicon materials and derivatives thereof. One approach that has been followed is described in U.S. Pat. No. 4,214,920, (Exxon), filed Mar. 23, 1979, by Amick et al., which is herein incorporated by reference for all purposes. Exxon describes the use of rice hulls that are coked, but not to rice hull ash from a burning step (referred to herein as "RHA"), to produce Si directly with boron contents of ≦1 ppm. With reference to FIG. 1, this process includes a step of providing rice hulls 10, (referred to herein as "RH"). RH, regardless from where in the world it is obtained, has relatively similar impurity levels. The Exxon process includes a cleaning step 11, of leaching the RH in a boiling 10 percent aqueous solution of HCl followed by washing with electronics grade water. Thereafter, the process includes a step of coking 12 the rice hulls at 900° C. (in a non-oxidative atmosphere, with considerable evolution of gases and smoke) in flowing Ar/1 percent HCl to form a material with a C:$SiO_2$ ratio of about 4:1 while preserving the low impurity contents. Following the coking step, the patent discloses a step of further coking 15 at about 950° C. with flowing $CO_2$ to adjust the C:$SiO_2$ ratio to about 2:1. The resulting particles are then converted into pellets using a step of pelletizing 16 that includes compounding the particles with a sucrose binder and then forming the mixture into pellets. The process also includes a step of heating 17 the pellets in an electric arc furnace (e.g., using an Ar atmosphere) to about 1900° C. to produce a photovoltaic grade of silicon.

As such, there is a need for a process for synthesizing one or more of a wide variety of Si compounds directly or indirectly from high surface area $SiO_2$ derived from an agricultural waste products ("AWP"), such as rice hull ash, where the process is characterized as being simpler (e.g., requires fewer steps, such as fewer heating steps, fewer washing steps, fewer leaching steps; uses one or more steps that are relatively fast; uses a relatively low processing temperature, or any combination thereof), more environmentally friendly, more energy efficient (e.g., at least 20 percent more energy efficient), or any combination thereof.

SUMMARY OF THE INVENTION

In one aspect of the present invention, the invention pertains to a method for providing high purity silicon comprising the steps of providing an agricultural waste product (e.g., the ash remaining after burning a raw agricultural waste product, such as rice hull ash formed when burning rice hulls) having amorphous silica, carbon, and impurities; extracting from the agricultural waste product an amount of the impurities; changing the ratio of carbon to silica; and reducing the silica to high purity silicon (e.g., to photovoltaic silicon)

Another aspect of the invention is a method for producing high purity silicon comprising the steps of providing an agricultural waste product ("AWP") that includes amorphous silica, carbon and impurities, the AWP having a weight ratio of carbon to silica ranging from about 5:95 to about 60:40; extracting from the AWP an amount of the impurities using one or more applications of an aqueous acidic solution so as to form an extracted agricultural waste product, the one or more applications include a first application of an aqueous acidic solution; changing the ratio of carbon to silica by contacting (e.g., reacting) the extracted agricultural waste product with an ammonium hydroxide to increase the carbon to silica ratio to a ratio that ranges from about 1:1 to about 5:1 so as to form a cleaned agricultural waste product ("AWP$_{cl}$"), while at least partially extracting silica as an ammonium silicate; re-crystallizing the ammonium silicate in water, alcohol, or both; applying an alcohol (e.g., an alkanol) to the re-crystallized ammonium silicate to substantially reduce or eliminate impurities; applying a second application of an aqueous acidic solution to the AWP$_{cl}$ after the step of contacting with an ammonium hydroxide to further reduce or eliminate impurities from the AWPcl; combining the electronic grade colloidal silica and the AWP$_{cl}$; compacting the combined electronic grade colloidal silica and AWP$_{cl}$; and reducing the compacted electronic grade colloidal silica and AWP$_{cl}$ so as to form a high purity silicon (e.g., a photovoltaic grade silicon) using thermal heating, plasma heating, or a combination of both at a temperature of at least about 1300° C. (e.g., at least about 1400° C.).

Yet another aspect of the invention is a method for producing high purity silicon comprising the steps of providing rice hull ash that includes amorphous silica, carbon, and impurities, the rice hull ash having a ratio of carbon to silica ranging from about 5:95 to about 60:40; extracting from the rice hull ash an amount of the impurities with an aqueous acidic solution so as to form an extracted rice hush ash; changing the ratio of carbon to silica by reacting the extracted rice hull ash with an ammonium hydroxide (e.g., tetraalkylammonium hydroxide) to increase the carbon to silica ratio to a ratio that ranges from about 1:1 to about 5:1 so as to form a cleaned rice hull ash, RHA$_{cl}$; carbothermally reducing the silica from the RHA$_{cl}$ to photovoltaic grade silicon by heating in a gaseous atmosphere (e.g., an air, an inert, or a reducing atmosphere) at a temperature of at least about 1000° C.

Still another aspect of the invention is directed at a process including the step of: providing an agricultural waste product; reacting the agricultural waste product with an ammonium hydroxide to extract some or all of the silica, and producing tetraethoxysilane, silicate octaanion, octahydridodimethylsiloxyoctasilsesquioxane, a silsesquioxane, a derivative thereof, or any combination thereof from the extracted silica.

The various aspects of the invention may take advantage of processing advantages from the intimate mixing that may include reducing the reaction times, increasing reaction rates (e.g., the rate of carbothermal reduction may be increased by more than 10 times, more than 100 times or even more than 1000 times as compared with the quartz/carbon approach) increasing the throughput of an electric arc furnace (e.g., by at least 2 times, at least about 10 times, or even at least about 100 times), reducing the electric energy required for reduction, or any combination thereof.

As discussed herein, the invention identifies various routes (e.g., relatively low-cost routes) to producing high purity silicon, such as Si$_{pv}$. These routes may advantageously eliminate the need for chlorosilanes, eliminate one or more energy intensive steps, or both, by starting from a renewable waste product, such as an agricultural waste product (e.g., rice hull ash). Agricultural Waste Product, such as rice hull ash, that is derived from biomass by burning in a biomass fueled electric generator, or other device that captures or converts some or all of the thermal energy, may begin with a step that results in a net energy gain. In one specific example, the energy gain from the biomass conversion (e.g., the energy gain from the burning step) may be greater than the energy required to convert the ash (e.g., the RHA) into high purity silicon (e.g., into Si$_{pv}$).

DETAILED DESCRIPTION OF THE INVENTION

Definitions

As used herein, unless otherwise defined, the following terms have the definitions listed below:

Si$_{mg}$ means Metallurgical Grade Silicon having a silicon concentration greater than about 98 weight percent (for example from about 98 weight percent to about 99.9 weight percent). Upgraded Si$_{mg}$ means Upgraded Metallurgical Grade Silicon having a silicon concentration greater than about 99.9 weight percent (for example from about 99.9 weight percent to about 99.999 weight percent). Si$_{pv}$ means Photovoltaic Grade Silicon having a silicon concentration greater than about 99.999 weight percent (for example from about 99.999 weight percent to about 99.99999 weight percent). Si$_{eg}$ means Electronics Grade Silicon having a silicon concentration greater than about 99.99999 weight percent (for example about 99.9999999 weight percent). High purity silicon is silicon having a Si concentration greater than about 98 weight percent, preferably greater than about 99.9 weight percent, more preferably greater than about 99.99 weight percent, even more preferably greater than about 99.999 weight percent, and most preferably greater than about 99.9999 weight percent. Electronic Grade Water is water meeting the requirements set forth in ASTM D5127-90. For example, type E-I, type E-II, type E-III, and type E-IV water electrical resistivity greater than 18, 17.5, 12, and 0.5 MΩ-cm, respectively. Electronic Grade Alcohol is alcohol meeting the requirements set forth in the ASTM test method specific for the type of alcohol (e.g., n-butyl alcohol grades are described in ASTM D304). A reducing atmosphere refers to an atmosphere in which oxidation is substantially prevented (e.g., an atmosphere that is substantially or entirely free of oxygen and other oxidizing gases).

Unless otherwise specified, the term ppm herein refers to parts per million on a weight basis. Unless otherwise specified, the terms "the ratio of silicon to carbon", "the ratio of carbon to silicon", "the ratio of silica to carbon", and the "ratio of carbon to silica" refer to molar ratios.

In general, the invention relates to an improved method for making high purity silicon. comprising the steps of providing one or more agricultural waste products (AWPs) such as rice hull ash (RHA) that may include amorphous silica, carbon, and impurities, extracting an amount of the impurities, changing the ratio of carbon to silica, and reducing the silica ($SiO_2$) to high purity silicon (e.g., to metallurgical grade silicon, preferably to an upgraded metallurgical grade silicon, and more preferably to a photovoltaic silicon ("$Si_{pv}$")).

Figure 2:
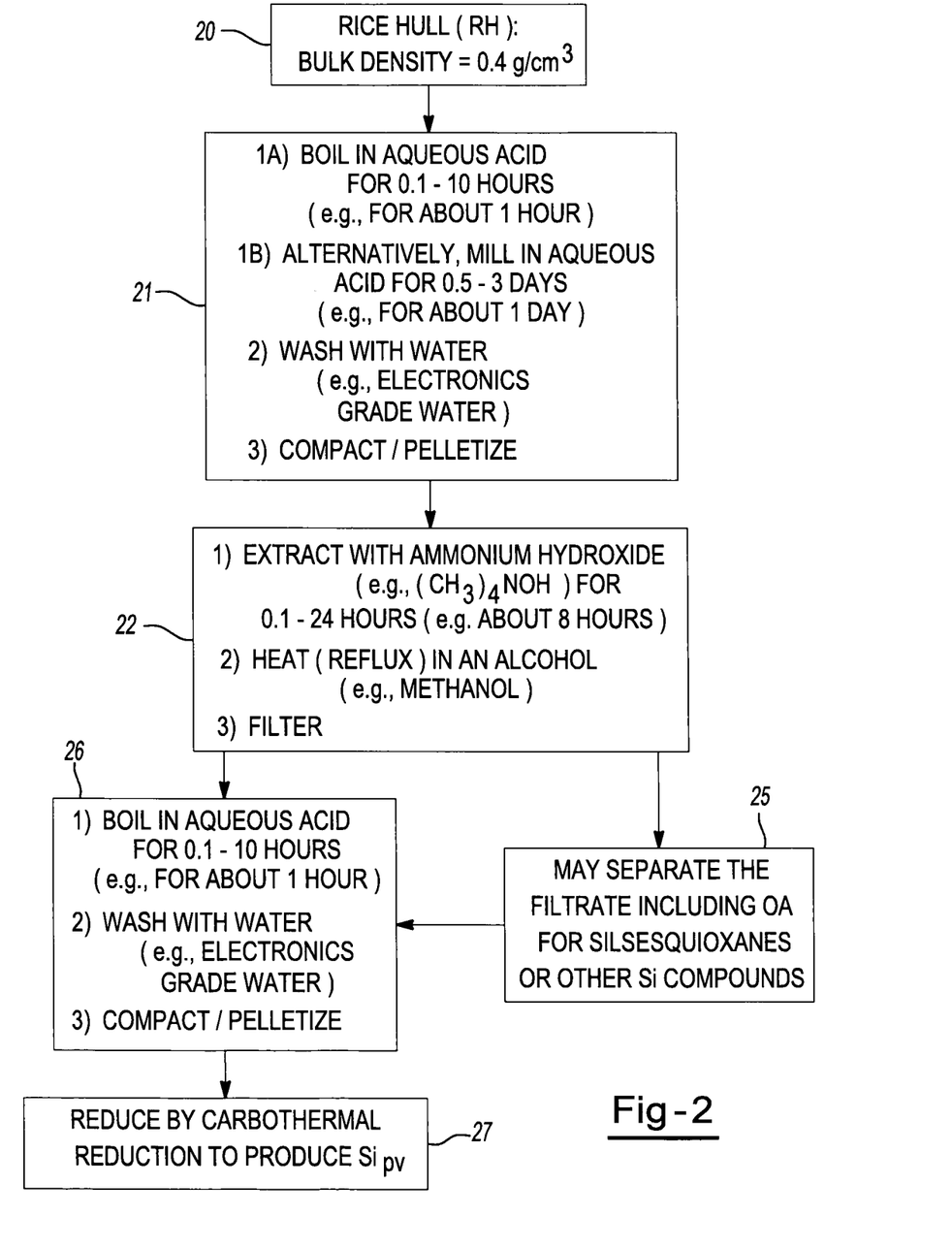
FIG. 2 illustrates a flow chart of one embodiment of the present invention.

With reference to FIG. 2, the process of one aspect of the invention includes the steps of: providing an agricultural waste product, such as a RHA 20 (e.g., having a density of about 0.4 g/cm$^3$); extracting impurities 21 from the RHA by leaching (e.g., in a boiling aqueous acid solution) for about 0.1 to about 10 hours (e.g., for about 1 hour) followed by washing in water (e.g., washing in electronics grade water), by acid milling (e.g., in an aqueous acid solution for about 0.5 to about 3 days) followed by washing in water (e.g., washing in electronics grade water), or both; extracting silica 22 from the RHA using an ammonium hydroxide (such as $(CH_3)_4$NOH), heating or refluxing in a boiling alcohol (such as methanol) and filtering; optionally separating 25 the filtrate to recover silicate octaanion (e.g., to form silsesquioxanes or other silicon compounds); again extracting impurities 26 from the RHA using a leaching step and washing with water (e.g., electronics grade water) and compacting the material; and carbothermally reducing 27 the material to produce a high purity metallic silicon, such as $Si_{pv}$.

The starting material for the process of this invention is any agricultural waste product (AWP), or by-product thereof, which contains silicon. Among preferred AWPs are rice hull ash (RHA), rice straw ash, biofuel waste, corn husk ash, or otherwise, or any combination thereof. A particularly preferred AWP is RHA. The AWP is preferably provided as an ash or other particulate resulting from the burning (e.g., burning in an oxidizing atmosphere, such as an atmosphere having a concentration of oxygen molecules greater than about 10 percent, a concentration of carbon dioxide molecules greater than about 10 percent, or both, preferably an atmosphere having a concentration of oxygen molecules greater than about 10 percent) of a raw AWP. The raw AWP (e.g., corn husks, rice hulls and the like) may be burned for their biomass fuel value, to save space, to produce the AWP, or any combination thereof. The step of providing an AWP may additionally include one or more steps of grinding, cutting, sieving, sedimenting, pressing, shredding, blending, melting, or otherwise, the agricultural waste product to generally assist in exposing the pores of the AWP for further processing. It is appreciated that reducing the mesh size and/or increasing the bulking density (i.e, decreasing the volume) of the of the AWP may be desirable for handling and/or storage, although not required.

Typically AWPs include silica (e.g., amorphous silica and optionally, partially crystalline silica), carbon, and some impurities. For example, an AWP ash, such as RHA, preferably includes from about 60 weight percent to about 98 weight percent of silica (more preferably including or consisting essentially of amorphous silica), with the remainder being carbon (C), (more preferably, amorphous carbon (C), and the carbon preferably is present at a concentration from about 2 weight percent to about 40 weight percent based on the total weight of the ash) and impurities. The total concentration of silica (e.g., amorphous silica) and carbon (e.g., amorphous carbon) more preferably is greater than 80 weight percent, even more preferably greater than 90 weight percent, even more preferably greater than 92 weight percent and most preferably greater than 94 weight percent, based on the total weight of the ash (e.g., of the RHA). Ashes with other concentrations of amorphous silica and amorphous carbon may also be employed It is appreciated that the AWP preferably has a density (e.g., a bulk density) of at least about 0.01 g/cm$^3$, preferably at least about 0.1 g/cm$^3$, more preferably at least about 0.2 g/cm$^3$. and most preferably at least about 0.3 g/cm$^3$ (e.g., from about 0.3 to about 0.9 g/cm$^3$).

AWP may be available from a variety of sources with C:$SiO_2$ ratios that range from about 5:95 to about 60:40 (e.g., from about 5:95 to about 25:75). The $SiO_2$ concentration in the AWP may be at least about 40 percent, preferably at least about 60 percent, more preferably at least about 70 weight percent, and most preferably at least about 75 percent by weight of the AWP. One or more properties of the AWP, such as the $SiO_2$ and C being partially amorphous or even substantially amorphous (e.g., at least 80 percent, at least 90 percent, or at least 95 percent of the $SiO_2$, the C, or both is amorphous), the $SiO_2$ and C being intimately mixed (e.g., at the submicron, or even at the molecular level), or both, may make the AWP much more reactive than blends of quartz and simple carbon sources, thereby offering processing advantages and a higher purity than the quartz/carbon approach (e.g., as discussed by U.S. Pat. No. 4,214,920, by Amick et. al, which is incorporated by reference herein for all purposes).

Residue from biofuel processes may be utilized as an alternate routes for direct conversion of agricultural waste products to $Si_{pv}$. These residues from the biofuel processes may include plant incorporated silica. It is appreciated that by using a by-product of biofuel processes for producing silicon (e.g., high purity silicon), such biofuel process may become more desirable.

Extracting Impurities

The method preferably include one, two, or more (e.g., at least two, or at least three) steps of extracting an amount of the impurities from the AWP. Examples of impurities that may be extant in unpurified AWP (e.g., unpurified RHA) include aluminum (e.g., at a concentration on the order of 1000 ppm), calcium (e.g., at a concentration on the order of 4000 ppm), potassium (e.g., at a concentration on the order of 25000 ppm), or any combination thereof.

Without limitation, the one or more steps of extracting impurities may include one or more steps of washing in an acid (e.g., an aqueous acid). Preferably one or all of the steps of washing in an acid is followed by one or more steps of washing in water (e.g., washing in boiling water), so as to further assist in removing the extracted impurities. Examples of acid washes that may be employed include acid milling and leaching (e.g., in a hot acid). The process preferably include one or more acid milling steps, one or more leaching steps, or both.

The step of washing in an acid may include a step of contacting the AWP with an aqueous acidic solution. The step of washing in an acid may employ any aqueous acid solution that is capable of remove a substantial amount of impurity from the AWP. Examples of acids that may be used include mineral acids, carboxylic acid, or combinations thereof. The acid preferably is a relatively strong acid (e.g., an acid having an acid dissociation constant, pKa, that is less than about 2, preferably less than about 0, and most preferably less than about −2). Without limitation, the aqueous acid solution may include sulfuric acid, hydrochloric acid, methanesulfonic acid, trifluoromethanesulfonic acid, formic acid, acetic acid, propanoic acid, or otherwise, or any combination thereof. Examples of water may include, but are not limited to tap water, deionized water, distilled water, electronic grade water, or otherwise, or any combination thereof. In one preferred embodiment, a dilute aqueous hydrochloric acid solution may be used. The concentration of acid in the aqueous acid solution may be any concentration that effects the partial or complete removal of one or more impurities form the AWP. It is appreciated that the acid concentration of the aqueous acid solution may be at least about 1 percent, preferably at least about 3 percent, more preferably at least about 5 percent, even more preferably at least about 9 weight percent, and most preferably at least about 10 percent by weight. Furthermore, the aqueous acid solution may have an acid concentration less than about 75 percent, preferably less than about 50 percent, and more preferably less than about 40 percent, even more preferably less than about 37 percent, and most preferably less than about 25 percent by weight. For example, the acid concentration of the aqueous acid solution may range from about 1 percent to about 75 percent, from about 10 to about 50 percent, from about 3 percent to about 37 percent, or from about 5 percent to about 40 percent by weight of the solution. The aqueous solution preferably has a pH less than about 7, more preferably less than about 5 and most preferably less than about 3.

The step of extracting impurities may be performed in a single application or in multiple applications (e.g., stages), in a batch mode, or in a continuous mode. It is contemplated that during the step of extracting impurities, the impurities may be extracted from the agricultural waste product with the aqueous acidic solution using one or more applications of aqueous acidic solutions. More specifically, for example, the aqueous acidic solution may be applied before, during, or after one or more of the other method steps (e.g., before the compacting step, before the reducing step, after the changing the ratio step, or otherwise) in a single application, a series of continuous applications, multiple separate applications, or otherwise.

It is contemplated that as the purity of the AWP, silica, or other silicon containing compound is increased, it may be important to prevent adding impurities into the process (e.g., during a processing step in which impurities are removed, or during any subsequent processing step). As such, high purity (e.g., greater than about 99 weight percent, greater than about 99.9 weight percent, greater than about 99.99 weight percent, greater than about 99.999 weight percent, or electronic grade) chemicals (e.g., water, alcohols, acids, bases, solvents, and other chemicals) may be used in the step of extracting the impurities and/or in any of the other steps described herein.

Desirably, the impurities may be extracted such that all the impurities or individual impurities (e.g., boron, phosphorous, aluminum, transition metals, or otherwise) may be present in an amount less than about 100 ppm, preferably less than about 50 ppm, and more preferably less than about 25 ppm by weight based on the total weight of the extracted AWP.

The acid washing step may use any temperature that removes a significant amount of impurities in a reasonable time. The acid washing step may use an acid washing temperature (i.e., the temperature of the aqueous acid solution) that is relatively low (e.g., from about 5° C. to 25° C.), or that is relatively high (e.g., greater than about 25° C.). In one embodiment, the extraction step may include heating the AWP in the aqueous acidic solution (e.g., at about the boiling point of the solution). It is appreciated that the AWP may be heated to a temperature (e.g., to an acid washing temperature) of at least about 25° C., preferably at least about 30° C., and more preferably at least about 50° C. The acid washing temperature may be less than 120° C., and preferably less than 100° C. For example, the temperature may range from about 25° C. to about 120° C., and preferably from about 50° C. to about 10° C. However, it is appreciated that at high temperatures (e.g., temperatures greater than 100° C.), the acid solution may begin to boil out depending on the acid concentration and type. Depending upon the acid strength, solids concentration, mixing, temperature, and the desired product characteristics, the step of extracting impurities may be achieved in an acid washing time (e.g., for a single acid washing step), a total acid washing time (e.g., for the total of the one or more acid washing steps), or both, of at least about 3 seconds, preferably at least about 6 seconds, more preferably at least about 15 minutes, even more preferably at least about 1 hour, and most preferably at least about 3 hours (e.g., at least about 10 hours). Furthermore, the extracting step may be achieved in an acid washing time, a total acid washing time, or both, of less than about 50 hours, more particularly less than about 40 hours, and still more particularly less than 20 hours.

The step of extracting the AWP of an amount of impurities may reduce the overall impurity levels for the extracted AWP (e.g., extracted ash, such as extracted RHA), to similar, or even lower impurity levels relative to the impurity levels discussed in U.S. Pat. No. 4,214,920, which is herein incorporated by reference for all purposes. Performing multiple extraction steps (e.g., consecutively, staggered between one or more other steps, or both) with similar or different concentrations of acid each time may serve to further reduce the impurity levels to (or preferably lower than) those discussed in U.S. Pat. No. 4,214,920. It is surprisingly discovered that at least one step of extracting impurities may advantageously follow a step wherein silica is removed to open up (e.g., expose) pores of the AWP (i.e., to create a porous material).

As previously discussed, a step of extracting impurities (e.g., each step of extracting impurities) preferably includes a step of rinsing the impurities extracted AWP in water (e.g., cold water, warm water, boiling water, or any combination thereof). Examples of water that may be employed in the step of rinsing the extracted AWP may include, but are not limited to tap water, deionized water, distilled water, electronics grade water, or otherwise, or any combination thereof. Preferably deionized water, distilled water, electronics grade water, or any combination thereof is employed.

Acid Milling

As previously disclosed, acid milling is one of the preferred methods of acid washing. As such, the step of extracting impurities may include one or more acid milling steps. Acid milling is a wet milling process that uses an aqueous acid and a milling media (such as particles of a mineral, a metal, or other crystalline material). Without limitation, the acid milling step may use zirconia milling media, an aqueous HCl solution (such as one described above), or both. The acid milling step may use any of the acid washing times and acid washing temperatures described above for the general acid washing step. If employed, the total time for the one or more acid milling steps preferably is greater than about 0.5 hours, more preferably greater than about 2 hours even more preferably greater than about 6 hours, and most preferably greater than about 12 hours. The total time for the one or more acid milling steps preferably is less than about 10 days, more preferably less than 5 days, even more preferably less than about 3 days, and most preferably less than about 2 days. For example, the total time for the acid milling may be about 1 day. The step of acid milling preferably reduces the average particle size of the AWP (e.g., the RHA). After the acid milling step(s), the mean particle size of the AWP preferably is less than about 100 μm, The step of acid milling (e.g., the first acid milling step) may result in the removal of at least 80 ppm of iron, the removal of at least 420 ppm of Mg, the removal of at least 250 ppm of Na, the removal of at least 10000 ppm of K, or any combination thereof. The step of extracting impurities may additionally include one or more steps of washing the milled AWP with one or more boiling water washes to remove re-adsorbed impurities. For example the boiling water wash may remove about 80 ppm of Fe, about 130 ppm about of Mg, about 50 ppm of Al, about 80 ppm of Na, 3600 ppm of K. Furthermore, any phosphorous initially present in the AWP (e.g., in the RHA) may be completely removed at this point of the process (e.g., below detectable limits).

Acid Leaching

As previously disclosed, acid leaching is another preferred method of acid washing. As such, the step of extracting impurities may include one, two, or more acid leaching steps. The acid leaching may be in addition to other acid washing steps (preferably the process may include at least one acid milling step and at least one acid leaching step. The acid leaching step may include an acid washing times as disclosed above, an acid washing time as disclosed above, or both. Typically, the acid leaching step employs a boiling acid (e.g., an aqueous acid containing at least about 3 weight percent acid, preferably at least about 25 weight percent acid). The time for the acid leach step preferably is from about 0.25 to about 18 hours. Any of the acids previously disclosed may be employed in the acid leaching step. Without limitation, the acid leaching step may employ an aqueous HCl solution containing from about 3 weight percent to about 37 weight percent HCl). The leaching step preferably is followed by one or more steps of washing in boiling water, such as described above for the step of washing following the acid milling step. In particular, the use of both an acid leaching step and a step of washing in boiling water may remove at least 5 times (preferably at least 20 times, e.g., about 40 times) more Fe impurities than an acid leaching step alone. The step of extracting the impurities from the AWP (e.g., from the RHA) preferably includes two or more acid leaching steps (typically with a step of washing with boiling water following each leaching step).

Extracting Silica

The method of the present invention preferably includes one or more steps of changing (e.g., increasing) the carbon to silica ratio (i.e., the $C:SiO_2$ ratio) and/or one or more steps of completely removing the silica from the AWP. For example, some of the AWP may be converted to a material having a relatively high $C:SiO_2$ ratio, some of the AWP may be converted to a material that is substantially free of $SiO_2$, or both. The step of changing the carbon to silica ratio and the step of completely removing the silica typically includes a step of extracting silica, such as a step of reacting the AWP (e.g, the AWP after one or more steps of extracting impurities) with an ammonium hydroxide, so that silica is partially, or completely removed from the AWP. The step of extracting silica may advantageously be employed to reduce the concentration of silica, to increase the surface area of the AWP, to form a porous material, to generate clean carbon, or any combination thereof.

The step of changing the carbon to silica ratio results in a "clean" AWP (i.e., "$AWP_{cl}$") in which some or all of the silica is extracted using one or more steps of extracting silica, The percent of the silica that is extracted from the AWP in the step of extracting silica is preferably at least about 20 percent, more preferably at least about 50 percent, even more preferably at least about 65 percent, and most preferably at least about 80 percent by weight based on the total weight of the $SiO_2$ in the AWP prior to the step of extracting silica. For purpose of illustration, the step of extracting silica may use an AWP that initially contain 75 weight percent $SiO_2$ and 25 weight percent carbon and upon reacting with an ammonium hydroxide, the $SiO_2$ concentration may be reduced by 50 percent, so that the composition of the $AWP_{cl}$ becomes about 60 percent $SiO_2$ and about 40 percent carbon). The $C:SiO_2$ ratio of the $AWP_{cl}$ may be less than about 20:1, preferably less than about 4:1, and more preferably less than about 2:1 (e.g., about 1:1). The reaction time between the AWP and the ammonium hydroxide for the changing the ratio step may depending upon the initial $C:SiO_2$ ratio of the extracted AWP, the $C:SiO_2$ ratio of the $AWP_{cl}$, or both.

The $AWP_{cl}$ will typically be a porous material having a relatively high surface area. The surface area (e.g., the BET surface area) of the AWP (i.e., the $AWP_{cl}$) after the silica extraction step is typically greater than the surface area of the AWP prior to the silica extraction step. For example, the ratio of the BET surface area of the AWP after the silica extraction step to its surface area prior to the silica extraction step may be greater than 1.1, preferably greater than 2, more preferably greater than 3, even more preferably greater than about 5, and most preferably greater than about 10. As such, the BET surface area of the $AWP_{cl}$ may be greater than about 1 $m^2/g$, preferably greater than about 8 $m^2/g$, more preferably greater than about 50 $m^2/g$, even more preferably greater than about 100 $m^2/g$, and most preferably greater than about 150 $m^2/g$.

In one preferred embodiment, the ammonium hydroxide may be any ammonium hydroxide which is capable of removing silica from the AWP. Preferably, the ammonium hydroxide is a quaternary ammonium hydroxide such as tetraalkylammonium hydroxide, or otherwise. Examples of preferred tetraalkylammonium hydroxides include, but are not limited to, tetramethylammonium hydroxide, tetraethylammonium hydroxide, trimethyloctylammonium hydroxide, trimethylethanolammonium hydroxide, trimethylpropanolammonium hydroxide, or otherwise, or any combination thereof. The ammonium hydroxide may be in a solution, such as a solution containing an alcohol, a base, water, or any combination thereof. Preferably the ammonium hydroxide is in a solution including or consisting substantially of one or more alcohols. Preferred alcohols for use in the step of extracting silica include alcohols having a boiling point less than about 180° C., more preferably less than about 150° C. The alcohol preferably is an alcohol containing from about 1 to about 8 carbon atoms, more preferably from about 1 to about 5 carbon atoms. Without limitation, alcohols which may be used include methanol, ethanol, n-propanol, n-butanol, isobutanol, 2-butanol, 2-propanol, or any combination thereof. The silica extraction temperature is any temperature at which a substantial amount of silica can be extracted from the AWP in less than 7 days. The silica extraction temperature is preferably greater than about 30° C., more preferably greater than about 60° C., even more preferably greater than about 80° C., and most preferably greater than about 100° C. For example, the silica extraction temperature may be at or near the boiling point (e.g., within about 20° C., preferably within about 10° C., or more preferably within 5° C., of the boiling point at 1 atmosphere pressure) of an alcohol in the solution. For purposes of illustration, the process may include a step or refluxing an alcohol, such as refluxing ethanol at about 78° C., or refluxing n-butanol at about 118° C. It will be appreciated that the silica extraction time (i.e., the time for the step of reacting the AWP with the ammonium hydroxide) may depend on the silica extraction temperature, the initial $C:SiO_2$ ratio, or both. The silica extraction time may be any time at which a substantial amount of the silica is extracted from the AWP. The silica extraction time is preferably greater than about 0.1 minutes, more preferably greater than about 5 minutes, even more preferably greater than about 20 minutes, even more preferably greater than about 80 minutes, and most preferably greater than about 300 minutes. The silica extraction time preferably is less than about 48, more preferably less than about 24 hours, and most preferably less than about 10 hours, however, longer silica extraction times may be employed.

SDRHA and SARHA

In one preferred embodiment of the invention, the $AWP_{ci}$ is a silica depleted AWP, such as a silica depleted rice hull ash (i.e., "SDRHA"), having a carbon to silica ratio greater than about 2:1. The silica depleted AWP (e.g., the SDRHA) may have a carbon to silica ratio less than about 9:1, however higher carbon to silica ratios are also anticipated.

In another preferred embodiment of the invention, the $AWP_{ci}$ is a silica adjusted AWP, such as a silica adjusted rice hull ash (i.e., "SARHA"), having a carbon to silica ratio equal to or less than about 2:1. The silica adjusted AWP (e.g., the SARHA) may have a carbon to silica ratio of at least about 0.9:1. A particularly useful SARHA is an SARHA having a carbon ratio from about 1.3:1 to about 2.0:1, preferably from about 1.45:1 to about 1.95:1, more preferably from about 1.60:1 to about 1.90:1, and most preferably from about 1.70:1 to about 1.85:1.

As previously described, the process may optionally include a step of completely removing the silica from the AWP. If employed, the step of completely removing the silica, may include one or more silica extraction steps that extract as much of the silica as possible from the AWP (e.g., the impurity extracted AWP). For example, the process may include one or more steps of extracting silica (such as those described above) whereby at least 90 percent, at least 98 percent, or at least 99 percent of the silica is extracted, based on the initial weight of silica prior to the one or more (e.g., all) of the silica extraction steps. If employed, the step of completely removing the silica may leave a carbon rich material having a carbon concentration greater than about 90 weight percent, preferably greater than about 95 weight percent, and most preferably greater than about 99 weight percent. The process may also include one or more steps of acid washing steps (such as an acid washing step described above) that remove or reduce the impurities in the carbon rich material. The process may also include subjecting the carbon rich material to one or more additional steps of extracting impurities (such as previously described, e.g., one or more steps of acid washing) to reduce the impurity levels to form a "cleaned carbon". The cleaned carbon may have a purity of carbon greater than about 95 weight percent, preferably greater than about 99 weight percent, more preferably greater than about 99.9 weight percent, and most preferably greater than about 99.99 weight percent.

The step of extracting silica typically includes a step of forming a silicate octaanion ("OA"), e.g., a soluble silicate octaanion. The OA may optionally be used to produce silsesquioxane products as discussed herein. The OA may optionally be purified e.g. by recrystallizing. For example, the OA may be recrystallized using an alcohol such as an alkanol (e.g., butanol) and a cold wash to form an OA having a silica purity of at least about 99 weight percent, preferably at least about 99.9 weight percent, more preferably at least about 99.99 weight percent, and most preferably at least about 99.999 weight percent. The OA (e.g., the purified OA) may optionally be used in a combining step to form a silica containing admixture as described below.

As discussed above, the present invention preferably includes a step of extracting impurities (e.g., a second step of extracting impurities, such as a single application or multiple applications of an aqueous acidic solution). Without being bound by theory, it is believed that removing significant amounts of $SiO_2$ (e.g., in the step of changing the ratio of carbon to silica) may generate porosity such that a subsequent impurities extracting step may be particularly advantageous for reducing impurities (e.g., for further reducing impurities). Such a step of extracting impurities subsequent to a step of changing the ratio of $C:SIO_2$ may reduce (e.g., substantially reduce or eliminate) the impurities (M), where M may be such impurities as boron (B), phosphorous (P), aluminum (Al), one or more transition metals, one or more other metals, or any combinations thereof.

Combining Step

The process may include one or more steps of combining at least two materials selected from the group consisting of the group consisting of the extracted silica, the $AWP_{ci}$ (e.g., the SARHA, the SDRHA, or both), the RHA, the clean carbon, carbon black, graphite, and a binder material where at least one of the materials is a material containing silica to form an silica containing admixture. For example, it is appreciated that the extracted silica may be added (e.g., reintroduced) to the "cleaned" carbon to reduce or otherwise adjust the carbon to silica ratio. After the combining step, (e.g., after reintroducing the extracted silica and the cleaned carbon), the admixture may be characterized by a carbon to silica ratio of at least about 1:1, preferably at least about 1.3:1, more preferably at least about 1.5:1, and most preferably at least about 1.65:1. As used herein the carbon to silicon ratio of the admixture is the ratio of the total moles of carbon (from all of the components of the admixture) to the total moles of silica (from all of the components of the admixture). The carbon to silica ratio of the admixture is preferably less than about 4:1, more preferably less than about 3:1, even more preferably less than about 2.5:1, and most preferably less than about 2.2:1. Depending on the final product desired, and the reduction process employed, a specific range of the carbon to silica ratio may be desired. For example admixture may be prepared so that the carbon to silica ratio of the admixture is within one of the following ranges: from about 1.6:1 to about 1.8:1, from about 1.7:1 to about 1.9:1, from about 1.8:1 to about 2.0:1, from about 1.9:1 to about 2.1:1, or from about 2.0:1 to about 2.2:1.

In one aspect the invention, in the combining step the OA (e.g., a purified OA, such as a recrystallized OA) may be reintroduced to one or more of the other materials that contain carbon (e.g., the AWP, the SARHA, the SDRHA, carbon black, graphite, the "cleaned" carbon, or any combination thereof) in a carbon/silicon recombining step to carefully adjust the $C:SiO_2$ ratio. The recombining step may include a step of reintroducing the OA via a precipitation process such that the silica may form xerogels, aerogels, or a combination, within and/or on the carbon.

Advantageously, the admixture includes carbon domains and silica domains that are small and/or intimately mixed, such that the domains of silica, the domains of carbon, or preferably both have a mean size (e.g., a mean thickness, a mean diameter, a mean radius of gyration, or a mean length), that is preferably less than about 1 mm, more preferably less than about 0.1 mm, even more preferably less than about 0.01 mm, and most preferably less than about 0.001 mm. It is found that the small size of the carbon domains, the small size of the silica domains, or both, result in a step of reducing silica to silicon, as discussed below, that is surprisingly fast and efficient.

Compacting Step

Figure 3:
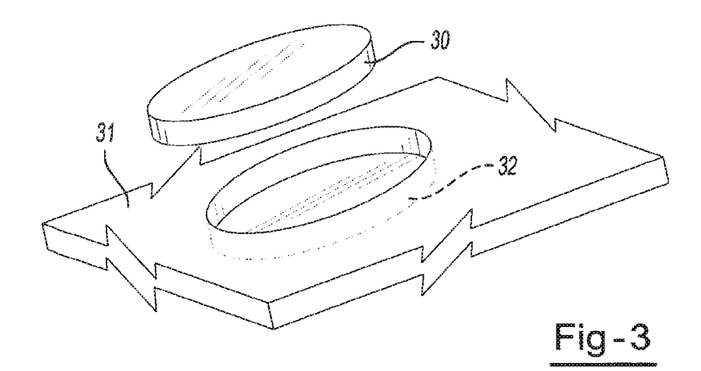
FIG. 3 is a schematic of an illustrative device for making a compacted material

Preferably, the process includes one or more compacting steps prior to the step of exposing the silica to a reduction means, (e.g., prior to a step of extracting impurities, following a step of extracting impurities, prior to a step of extracting silica, following a step of extracting silica, or any combination thereof). Compacting means subjecting a material including an AWP (e.g., the admixture) to a step which increases the bulk density. Advantageously, the step of compacting may provide improvements in processing and more specifically in handling the material. Uncompacted raw AWP, such as rice hulls (RH), typically have a bulk density less than about 0.2 g/cm$^3$ (e.g., from about 0.1 to about 0.2 g/cm$^3$) and uncompacted AWP, such as RHA, typically has a bulk density greater than about 0.2 g/cm$^3$ (e.g., from about 0.3 to about 0.9 g/cm$^3$). AWP having lower bulk density may also be employed. The compacting step may be performed by any art known method that includes a step of applying a force to the material to increase its bulk density. As illustrated in FIG. 3, the compacting step may include a mold 31 having one or more holes or openings 32. The uncompacted material may be placed in the hole or opening (e.g., by applying a force on a mating plate) to form the compacted material 30. The compacting step may include a step of applying a compressive force to the material, (e.g., an uniaxial compressive force of at least about 20 MPa, preferably at least about 50 MPa) so that the compacted material has a relatively high bulk density (e.g., a bulk density of at least about 0.4, g/cm$^3$, more preferably at least about 0.75, g/cm$^3$, and most preferably at least about 1.1 g/cm$^3$, as shown in FIG. 3. The compacting step may increase the bulk density by at least 20 percent, preferably at least 50 percent, more preferably at least 100 percent, and most preferably at least 200 percent. For example, one or more of the compacting steps may be used to reduce the volume of the material being compacted so as to reduce storage costs, shipping costs, or lower. In one aspect of the invention, it is contemplated that the compacted material (e.g., the compacted AWP) may be formed into a pellet, rod, brick, the like, or otherwise (e.g., for chemical reduction thereafter). Referring again to FIG. 3, in one aspect of the invention, the compacted material 30 may be generally a rod or disk, the compacted material may have a dimension (e.g., a diameter) greater than about 0.4 mm (e.g., greater than about 10 mm), or both. In one aspect of the invention, the compacting step may be used to provide a compacted material (e.g., a compacted composite material) for insulation in a reactor that may be used to reduce this very same material.

The compacted silica containing material (e.g., the compacted AWP) may be formed free of an organic binder or may include an organic binder (e.g. sucrose, glucose, or both) so that a composite material is formed having sufficient structural integrity to be handled. Alternately, or in addition to an organic binder, the compacted material include OA that may function as a binder. If employed, the binder may be used at a concentration greater than about 0.1 weight percent, preferably greater than 0.5 weight percent and most preferably greater than about 1 weight percent based on the total weight of the compacted material (e.g., the compacted material may include a binder at a concentration from about 1 weight percent to about 10 weight percent).

In one aspect of the invention, the compacted material (e.g., the compacted RHA) preferably has an electrical conductivity greater than about $5 \times 10^{-5}$ S/cm, more preferably greater than about $4 \times 10^{-4}$ S/cm, and most preferably greater than about $5 \times 10^{-3}$ S/cm. The compacted material (e.g., the compacted RHA) preferably has an electrical conductivity less than about 0.43 S/cm, and more preferably less than about 0.1 S/cm. Higher and lower electrical conductivities may be used. Carbon black and/or graphite powder (e.g., high purity carbon black and/or graphite) may be added (e.g., at a concentration from about 0.1 to about 20 weight percent, preferably from about 1 to 10 weight percent based on the total weight of the compacted RHA) to adjust the electrical conductivity of the compacted RHA).

Reducing Silica to Silicon

In various aspects of the invention, the process further comprises one or more steps of reducing SiO$_2$ (e.g., to remove some, substantially all, or even entirely all of the oxygen). Without limitation, the process may include a step of reducing SiO$_2$ to form SiC, a step of reducing SiO$_2$ to form silicon metal, or both. In a particularly preferred aspect of the invention, the process includes one or more steps of reducing the SiO$_2$ to form high purity silicon metal (e.g., having a silicon concentration greater than about 99.99 weight percent, more preferably greater than about 99.999 weight percent), such as Si$_{pv}$. The step of reducing silica may employ any of the silica containing materials disclosed herein. For example, the reducing silica step may employ the silica containing admixture (as described above), an AWP (e.g., an AWP$_{ci}$, (such as RHA$_{ci}$) or other AWP that has been exposed to an step of extracting impurities), a SARHA, a SDRHA, or any combination thereof. Preferably the step of reducing silica employs a silica containing material that has been exposed to at least one step of extracting impurities, at least one step of extracting silica, or both. More preferably, the step of reducing silica employs a material that has been exposed to at least one step of extracting impurities, at least one step of extracting silica, contains a C:SiO$_2$ ratio from about 1.8:1 to about 2.2:1 and impurities (e.g., metal impurities) of less than about 25 ppm each).

The step of reducing the silica typically includes a step of exposing the silica to a reduction means (e.g., carbothermal, thermal heating, or otherwise) to produce a high purity silicon metal (e.g., Si$_{pv}$). The reduction means may include one or more steps of heating the silica containing material in a furnace, such as an arc furnace, an induction furnace, a microwave furnace, or otherwise, or any combination thereof. The reduction means preferably uses a compacted material (e.g., a material prepared using a compacting step described above).

Without being bound by theory, the carbothermal reduction of silica may employ the following reaction:

The carbothermal reduction of silica to silicon may occur at any temperature at which the reduction process may occur. The carbothermal reduction temperature is preferably greater than about 1000° C., more preferably greater than about 1300° C., even more preferably greater than about 1400° C., and most preferably greater than about 1700° C. The carbothermal reduction temperature preferably is less than about 2500° C., more preferably less than about 2300° C., and most preferably less than about 2100° C. It is appreciated that intimate SiO$_2$/carbon mixtures may result in lower carbothermal reduction temperature than the theoretical 1800° C. (e.g., less than about 1600° C., less than about 1400° C., less than about 1300° C.).

In one aspect of the invention silicon carbide (SiC) may be a product (e.g., the primary product) if carbon is in large excess and by way of heating (e.g., rapid heating) in an arc, induction, or microwave furnace or otherwise, or any combinations thereof may drive direct reduction to $Si_{pv}$.

Figure 4:
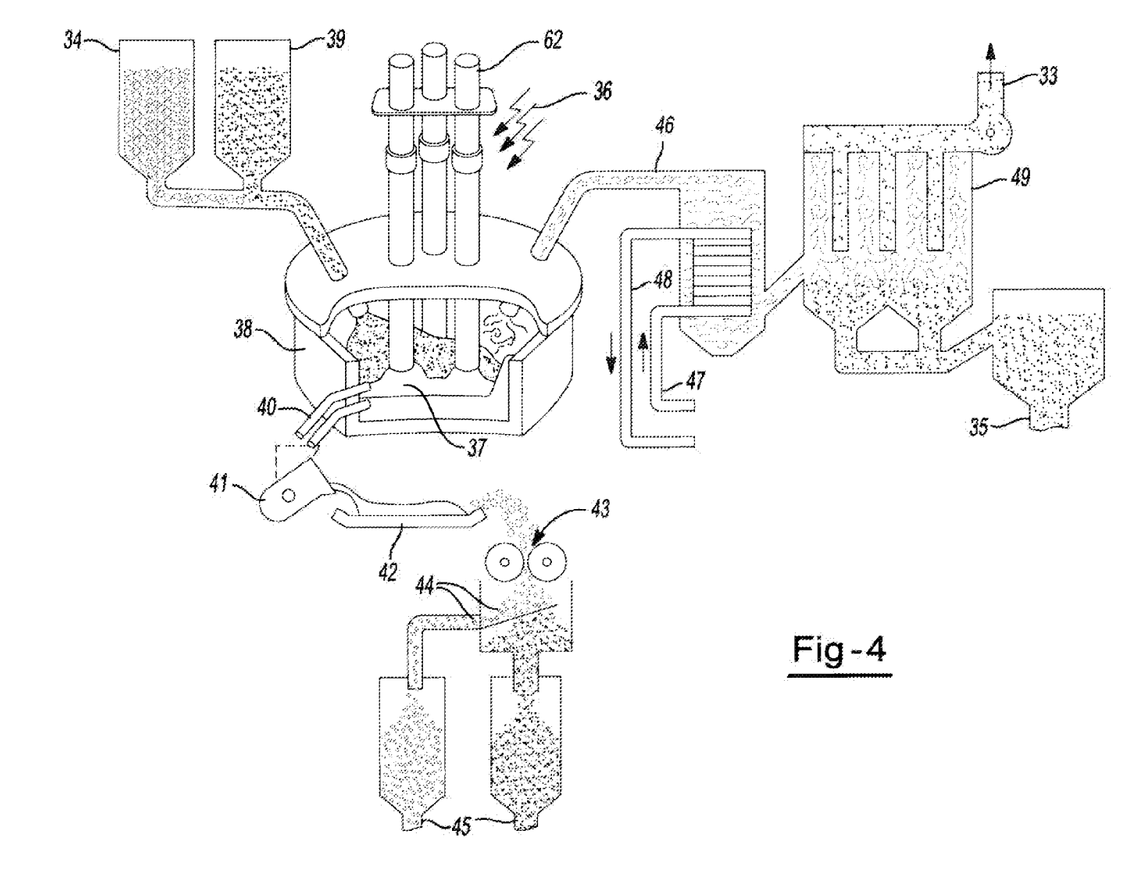
FIG. 4 illustrates one aspect of the present invention.

A process for generating silicon 40 using a carbothermal reduction step is illustrated in FIG. 4. The process may include as step of feeding 39 silica (e.g., quartz) 35 and carbon 34 into an arc furnace 38. The arc electrode may have a plurality of electrodes 62 that converts electrical energy 36 into an arc that heats the silica and the carbon and causes the carbothermal reduction of silica to silicon 45. Typical the silicon in the furnace will be molten silicon 37. The process may also produce one or more gases (such as SiO, CO, and $CO_2$) 46 that are removed from the furnace. The thermal energy from these gases may be removed using a heat exchanger 48 and the thermal energy may be recovered, stored, and/or converted into another form of energy (e.g., electrical energy). The process may include a step of filtering the gases 49 so that a clean gas 33 is produced, so that silica 35 is recovered, or both. The process may include a step of removing the molten silicon 37 from the furnace 38. The molten silicon may be undergo one or more steps of refining 41, one or more steps of solidifying 42, one or more steps of crushing 43, one or more steps of sizing 44, or any combination thereof. A process similar to that shown in FIG. 4 has been used to produce $Si_{mg}$ from quartz and carbon. Using a silica feedstock which has a higher purity than quartz (such as a feedstock including an $AWP_{cl}$) a commercial process such as the one depicted in FIG. 4 may be adapted to producing a high purity silicon, such as $Si_{pv}$.

Figure 5:
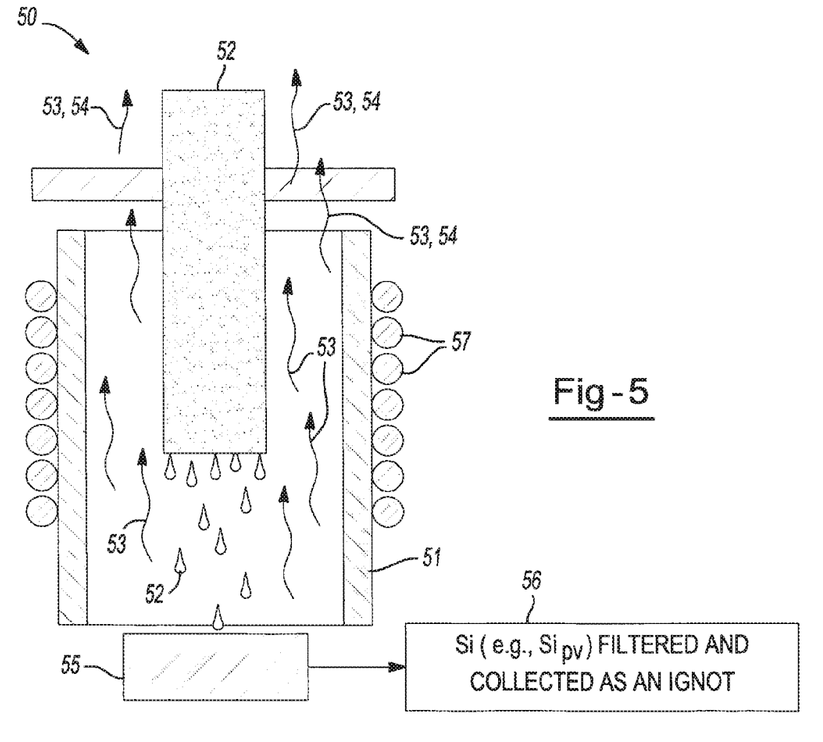
FIG. 5 illustrates a cross-section of an induction furnace that may be used in one aspect of the present invention.

A process including a carbothermal reduction step (e.g., a step of reducing silica) may be a process using an induction furnace, such as the process illustrated in FIG. 5. The induction furnace 50, may include one or more induction coils 57 outside of the furnace enclosure 51, such as a ceramic tube. A compacted silica containing material 52 (e.g., a compacted RHA) is placed in the furnace enclosure and a gas 53, such as an inert gas, air, or any combination thereof (preferably an inert gas such as Argon), flows through the furnace. A current through the induction coil results in heating of the silica containing material and a reaction that produces molten silicon metal 58 and carbon monoxide 54. The molten silicon metal drips off of the compacted silica containing material and is collected as silicon metal 55 at the bottom of the furnace. The silicon metal preferably is a high purity metallic silicon, such as $Si_{pv}$. The process may also include a step of filtering 56 the silicon metal and/or converting it into ingot.

Figure 6A:
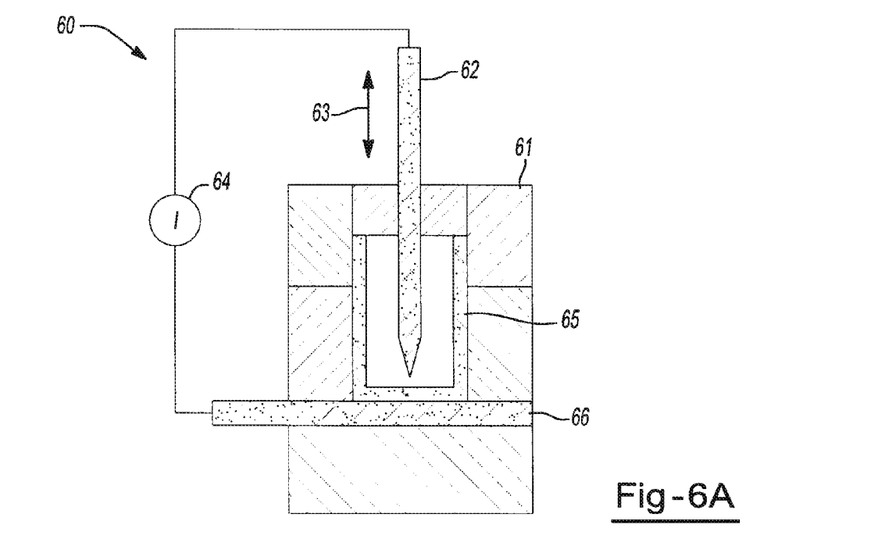
FIG. 6A illustrates a cross-section of an electric arc furnace that may be used in one aspect of the present invention.

A process including a carbothermal reduction step may employ a furnace (e.g. an electrical arc furnace, "EAF"), such as in the process illustrated in FIG. 6A. The EAF 60 may include a chamber that is partially or completely surrounded by a high temperature insulation 61, such as refractory bricks, and may have one or more interior walls 65 that include or covered by graphite. The EAF typically has a first electrode 62, such as a graphite rod electrode, and a second electrode 66, such as one or more graphite plate electrode. In one example the interior walls include graphite and are part of the second electrode. The first electrode may be mounted with the axis of the rod in a generally vertical orientation, and a perpendicular to at least a portion of the second electrodes. The first electrode may have an actuator or other means for moving (e.g., vertically moving) the first electrode toward or away from the second electrode for controlling the distance between the two electrodes. A silica containing material (e.g., a compacted silica containing material having a silica to carbon ratio from about 1.5 to about 2.2) is placed in the furnace. An electrical current 64 is applied to the two electrodes. The range of current needed, as well as the optimal current is dependant on the furnace size. For example, but not limiting to, when using a 4" diameter, 4" high furnace chamber, The current may be greater than about 5 A, preferably greater than about 20 A, more preferably greater than about 40 A, even more preferably greater than about 60 A, and most preferably greater than about 75 A. The current may be less than about 400 A, preferably less than about 200 A, more preferably less than about 150 a, even more preferably less than about 100 A, and most preferably less than about 85 A. The EAF carbothermally reduces the silica to form a product including or consisting essentially of silicon metal, silicon carbide, or both. It will be appreciated that an EAF may include a third electrode, employ a triple phase current, or both. With reference to FIG. 6A, it is expected that in a process employing an arc furnace, the high purity silicon metal (e.g., the $Si_{pv}$) is produced as the rod that is inserted into the heating unit drives the carbothermal reduction. Furthermore, it is expected that carbon is removed as carbon monoxide (CO), as $CO_2$, as other off-gases, or any combination thereof, that may be swept out by way of a gas flow (e.g., argon, helium, hydrogen, carbon dioxide, nitrogen would make silicon nitride or otherwise, or any combination thereof) within or through the heating unit.

Figure 6B:
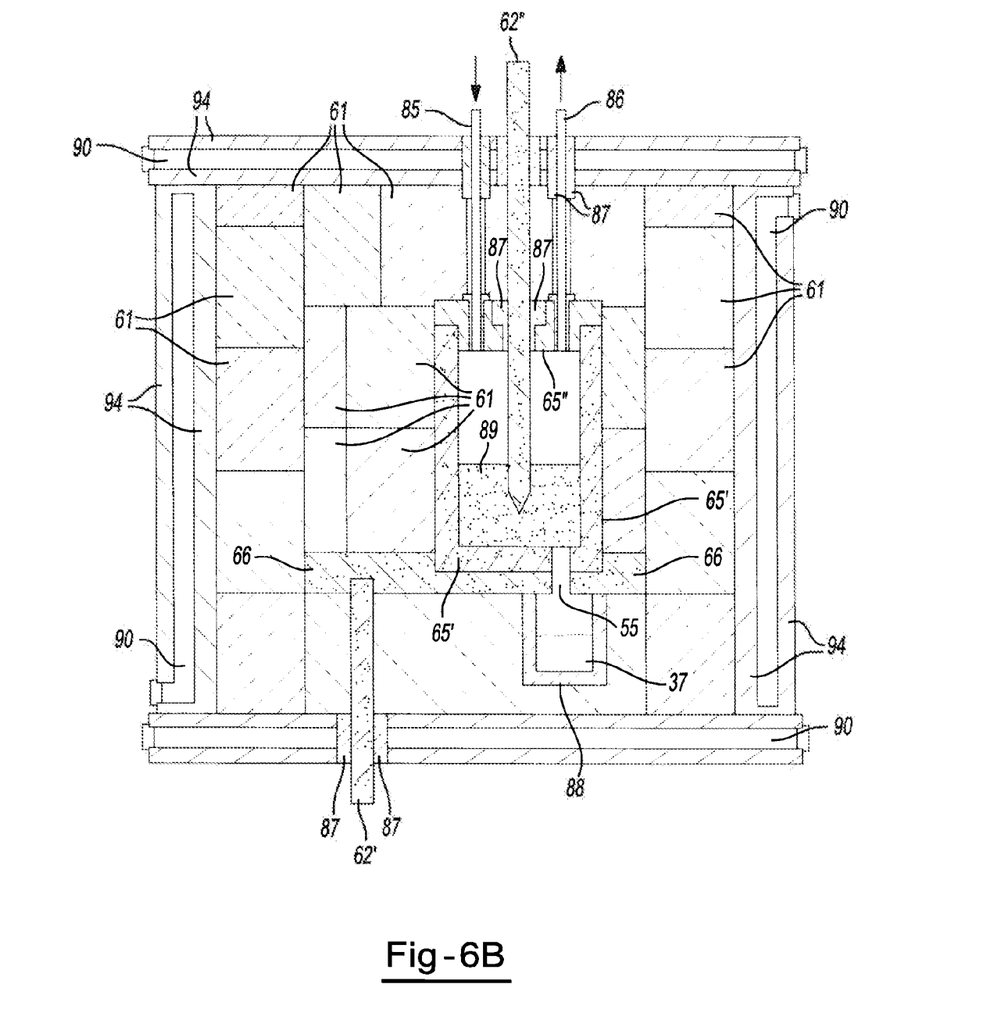
FIG. 6B illustrates a cross-section of an electric arc furnace that may be used in one aspect of the present invention.

FIG. 6B is a cross-section illustrating features of another arc furnace 60' that may be used in an carbothermal reduction step. The arc furnace may have a reaction chamber 92 that is in a first carbon or graphite crucible 65 having carbon or graphite walls 65' a carbon or graphite bottom 65', and a carbon or graphite lid 65". The reaction chamber may have two openings in the lid for a gas inlet 85 and a gas outlet 86. The gas inlet and the gas outlet may be formed of zirconia or other material that can withstand the temperatures of the furnace, the reactivity of the effluent gases, or both. Below the carbon or graphite bottom 65" of the chamber, the furnace may have a carbon or graphite plate 66 that is in electrical contact with the carbon or graphite bottom and in electrical contact with a first carbon or graphite rod 62' that may extends out of the furnace, The furnace may also include a second carbon, or graphite rod 62" that may extends from a point outside of the furnace, to the inside of the chamber. The first and second carbon or graphite rods may be connected to an arc welder or other device for supplying a potential between the second rod 62" and the first crucible 65. The second rod preferably is electrically isolated from first crucible (e.g., using a ceramic joint 87 that may act as an insulator) and is movable, so that the distance between the second rod and the bottom of the chamber can be controlled. The plate 66 and the first crucible bottom may have an opening 55 for removing molten silicon 37. Below the opening, the furnace may include a second carbon or graphite crucible 88 for collecting the molten silicon. The furnace may include an insulating material 61, such as alumina refractory brick surrounding the chamber. The furnace may also include one or more steel cylinders 94 that may be used for circulating water 90 or another heat transfer fluid for cooling the furnace, for recovering thermal energy, or both. The inlet, the outlet, the first rod, the second rod, or any combination thereof, may include a joint 87, such as a ceramic joint, for sealing the chamber so that the atmosphere in the chamber may be controlled. The furnace will include a silicon containing material (e.g., a mixture including RHA, a mixture of silica and carbon, or graphite, a mixture of silicon carbide and silica, or any combination thereof) 89 in the furnace, or having a means of being fed into the furnace.

The furnace may include a channel (e.g., a channel having graphite walls) in which the product (e.g., the molten silicon) can collect, flow out of the furnace, or both. Alternatively, the furnace may include a crucible or other vessel (e.g., a crucible or vessel having graphite walls) for collecting the product.

If employed, the carbon and graphite used in the furnace (e.g., the channel, the crucible, the electrodes, and the like, or any combination thereof) may be a high purity graphite (having a carbon concentration greater than about 99.9 weight percent, greater than about 99.99 weight percent, greater than about 99.999 weight percent, or greater than about 99.9999 weight percent).

Other Process Characteristics

The method of the present invention may be free of one or any combination of the following: a coking step, a carbon oxidation step using carbon monoxide, or a step of reacting with HCl/Argon, such as those described in U.S. Pat. No. 4,214,920, (Exxon), filed Mar. 23, 1979, by Amick et al. The elimination of one or any combination of these steps may result in a process having lower costs, reduced environmental impact, or both.

Preparing Other Silicon Containing Compounds Using the Extracted Silica.

Another aspect of the invention is a process for generating silicon containing compounds such as an octahydridodimethylsiloxyoctasilsesquioxane (i.e., "OHS") derived silsesquioxanes using the silicate octaanion (i.e., "OA"). Additionally, the process may include a step of recycling Me$_4$NCl produced back to Me$_4$NOH and therefore used as discussed above. This aspect of the invention may be used to generate one or more silicon containing compounds (e.g., that may be a byproduct), having a high surface area and/or a carbon to silica ratio of about 2:1, that may advantageously be used to produce Si$_{pv}$ (e.g., at costs lower than those based on the quartz rock purification process, at costs lower than those based on the process described in U.S. Pat. No. 4,214,920, with higher purities, with fewer process steps, or any combination thereof).

The process may employ one or more relatively strong bases, such as Me$_4$NOH, which may advantageously improve reaction rates. Furthermore, Me$_4$NOH may react with tetraethoxysilane [i.e., (Si(OEt)$_4$ or "TEOS"], which may provide a single product, such as the silicate octaanion (i.e., "OA"). OA may be functionalized to produce octahydridodimethylsiloxyoctasilsesquioxane (i.e., "OHS"). OHS in turn may be converted to one or more nanobuilding block silsesquioxanes (i.e., "SQs"). It is further appreciated that SQs may offer access to a variety of nanocomposite materials with diverse properties including, but not limited to abrasion and corrosion resistant coatings, transparent fiber reinforced polymer composites, controlled linear coefficient of thermal expansions from $20 \times 10^{-6}$ to $250 \times 10^{-6}$ m/m° C. and barrier membranes. These materials may further provide thermal stabilities that exceed those of simple organic analogs because of the improved heat capacity offered by the 0.5 nm diameter single crystal of silica that makes up SQ cores.

One specific exemplary embodiment is directed at an improved method for producing TEOS. Prior methods for producing TEOS typically use a metallic silicon, such as Si$_{mg}$, in a relatively expensive process. Based on the discussion herein of silica dissolution kinetics, an alternate, relatively inexpensive process for producing TEOS using a relatively inexpensive silica source, such as an AWP (e.g., an RHA) has been identified. For example, the method for producing TEOS may take advantage of one or more features of the RHA, such as the relatively purity, the high surface area of the SiO$_2$, the amorphous carbon, the high surface area of the carbon, or any combination thereof.

It is appreciated that the invention is also directed at the use of AWPs, such as RHA, for the synthesis of existing and new Si containing compounds (e.g., resulting in the cost and/or the environmental advantages described herein), e.g., employing the methods as discussed herein, the Si containing feedstock chemicals discussed herein, or both. An alternate way to synthesize Si compounds directly from high surface area SiO$_2$ is discussed in Finalist, Discover Awards, 2001. Discover Magazine, June, 2001, which is herein incorporated for all purposes. In this process, SiO$_2$ (either silica gel, >600 m$^2$/g, fused silica 0.5-0.8 m$^2$/g, or sand <0.2 m$^2$/g) is placed in a large excess (e.g., ×10) of boiling ethylene glycol (or another -1,2-diol) with a group 1 metal hydroxide (e.g., KOH). After distillation of the water formed during the reaction and the excess ethylene glycol, the MSi(OCH$_2$CH2O)$_2$ OCH$_2$CH$_2$OH compound formed can be crystallized.

EXAMPLES

By way of example, various pathways to high purity silicon metal (e.g., Si$_{pv}$) and high purity SiC are discussed. The following examples are for illustration purposes only and should not be taken as limiting.

Example 1

AWP$_{CL}$ to High Purity Si Via Electric Arc Processing

Impurities are removed from a sample of an AWP having a molar ratio of carbon to silica from 5:95 to 60:40 using an acid wash followed by a boiling water wash. The AWP is then reacted with an ammonium hydroxide so that some of the silica is extracted and an AWP$_{cl}$ is formed having an increased molecular ratio of carbon to silica. The AWP$_{cl}$ is next compacted to produce bricks or rods. As such, the invention may be characterized as being free of any high purity arc electrodes other than the compacted AWP$_{cl}$ electrodes. The compacted AWP$_{cl}$ is conductive and is used as the arc electrodes. then run through an arc furnace such that molten silicon, is produced (e.g., using the chemical process described in reaction (1)) and is isolated in a SiC mold designed to catch the product but filter off any detritus including SiC. The arc furnaces operate by passing an arc directly through the AWP$_{cl}$ causing it to be heated to a temperature greater than about 1400° C. It is expected that a molten silicon metal is produced having an expected purity greater than about 99.99 weight percent.

Example 2

Induction Heating

Example 1 is repeated except an induction furnace is used instead of the arc furnace. It is expected that a molten silicon metal is produced having an expected purity greater than about 99.99 weight percent. As such, one aspect of the invention, is a process including a step of reducing silica uses an electric arc furnace, an induction furnaces, or both. Without being bound by theory, it is believed that at large scales, electricity usage may be lower for an electric arc furnace than for an induction furnaces. Additionally, it is expected that the capital costs for an arc furnace will be lower than for an induction furnace.

Example 3

Electric Generation/Carbothermal Reduction

A quantity of rice hulls is burned in an electricity generating process that produces a quantity of electrical energy and a quantity of rice hull ash. The quantity of rice hull ash is converted into $AWP_{cl}$ and then into a high purity silicon metal (e.g., a $Si_{pv}$) using an induction furnace. The electricity required for running the induction furnace is expected to be less than the quantity of electricity produced from burning the rice hulls. As such, the invention contemplates regenerating electricity as a by-product of the reactions. Furthermore the process may be characterized by one, two, or more steps (e.g., all steps, or the process in its entirety) that completely uses renewable resources (e.g., for energy, for silicon source, for carbon source, or compacted AWP, rod to produce molten silicon (e.g., molten $Si_{pv}$). The induction melting includes a step of passing a compacted rod of $AWP_{cl}$ through (e.g., vertically) an electric field (e.g., as illustrated in FIG. 5). The $AWP_{cl}$ is heated to an elevated temperature (e.g., to a temperature that drives reaction (1)). It is expected that the high purity silicon $Si_{pv}$ is produced as the rod that is inserted into the heating unit drives the carbothermal reduction. Furthermore, it is expected that carbon is removed as carbon monoxide (CO), as $CO_2$, as other off-gases, or any combination thereof, that may be swept out by way of a gas flow (e.g., argon, helium, hydrogen, carbon dioxide, nitrogen would make silicon nitride or otherwise, or any combination thereof) within or through the heating unit.

Example 4

The same process as in Example 3 is repeated, except the heating unit includes an inert gas flow that provides a substantially or completely unreactive atmosphere in the heating unit. In this example, CO or $CO_2$ is generated coincident with molten $Si_{pv}$ that drips off the end of the rod(s) and is collected in a crucible below. Suitable materials for a collection crucible include graphite, SiC, molybdenum, or the like. The inert gas flow continuously sweeps the CO off. The induction coils are separated from the rod by an insulator, such as a quartz tube, a ceramic tube, or the like.

Example 5

A powder of RHA having a silica to carbon ratio of about 1.8:1 is compacted to a density of about 1.0 g/cm³. The powder is then heated in an EAF with a current of about 80 A. The compacted RHA acts as a thermal insulator and the yield of silicon metal is less than about 1 percent, based on the total weight of silicon in the RHA.

Example 6

A RHA that has not been extracted for impurities is mixed with graphite and compacted to form a cylinder (diameter=about 3 cm, length=about 1.25 cm) having a silica to carbon ratio (including the carbon from the graphite) of about 1.8:1. The cylinder is placed in an EAF having two electrodes, including a 12.7 mm rod electrode and a plate electrode. A current of about 80 A is applied to reduce the silica to silicon metal. The yield is about 30 weight percent based on the total weight of the silicon in the RHA. The silicon metal has a purity of about 99.997 weight percent and contains about 1 ppm aluminum, about 7.2 ppm boron, about 15 ppm calcium, less than about 0.3 ppm copper, about 0.4 ppm iron, less than about 2 ppm potassium, less than about 1 ppm magnesium, less than about 0.3 ppm sodium, and less than about 1 ppm titanium.

Example 7

A RHA is acid milled for about 3 days in an aqueous solution containing about 9.75 weight percent HCl at about 23° C. with zirconia milling media. The acid milling removes about 80 ppm of Fe, 420 ppm of Mg, 250 ppm of Na and 10000 ppm of K. The material is then washed in boiling water to further remove impurities (e.g., impurities that re-adsorbed). The boiling water washes removes about 80 ppm Fe, about 130 ppm Mg, about 50 ppm Al, about 80 ppm Na, and about 3600 ppm K. After the boiling water washes, the phosphorous concentration is below detectable levels and the RHA has a purity (i.e., a total concentration of silica and carbon) of about 99.99 weight percent and an average particle size of about 1 micrometer. The material is then leached in boiling acid (about 18.75 weight percent HCl in water for about 1 hour) at a temperature of about 109° C. followed by a boiling water wash. The boiling water wash removes about 40 times more Fe impurities than the acid leaching alone. The acid leaching and boiling water steps are repeated. Next, the RHA is reacted with a tertiary ammonium hydroxide in boiling n-butanol at about 118° C. to extract some of the silica. The resulting silica adjusted RHA (SARHA) has a silica to carbon ratio of about 1.7:1. After partially extracting the silica, the SARHA has a specific service area greater than about 200 m²/g (as measured according to the BET method). The SARHA is again leached and washed in boiling water. The SARHA is then mixed with graphite (so that about 5 weight percent of the carbon in the mixture is from the graphite), compacted to form a cylinder, and then carbothermally reduced in an EAF using the same process as used in example 6. The resulting silicon metal has a purity of about 99.9994 percent and contains about 1.2 ppm aluminum, about 0.09 ppm boron, about 1.4 ppm calcium, less than 0.1 ppm copper, about 1.8 ppm iron, about 0.7 ppm potassium, about 0.1 ppm magnesium, about 0.04 ppm sodium, and less than about 0.1 ppm titanium. The yield of silicon metal is about 30 weight percent Based on the silicon concentration of the RHA.

The extracted silica is recovered from the silica extraction step in the form of silicate octaanion. The silica is recrystalized and purified with two cold butanol washes. The resulting silica nanoparticles have a purity of about 99.9996 percent and a specific surface area greater than about 400 m²/g (as measured using the BET method).

Example 8

Figure 8:
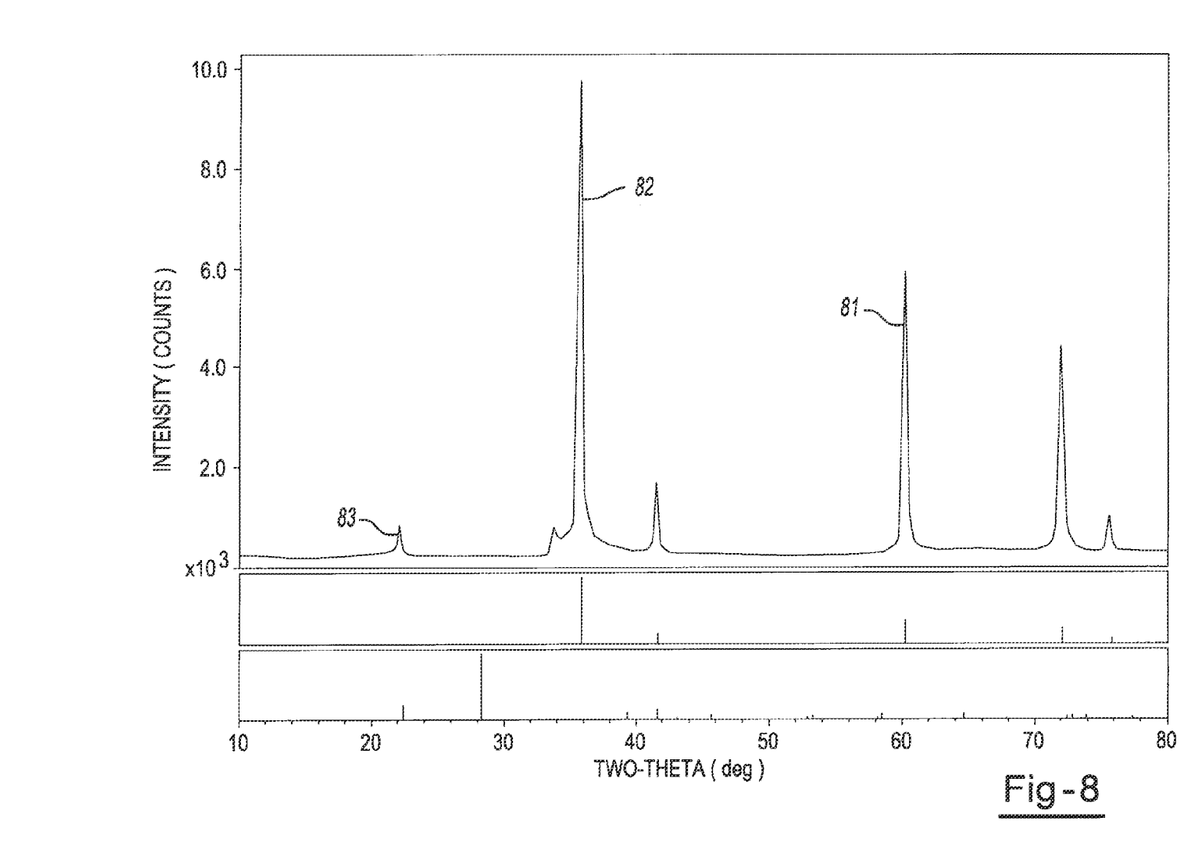
FIG. 8 is an illustrative x-ray diffraction curve.

RHA that is neither acid milled or leached is compacted and placed in the EAF. The material is mixed with a glucose binder and graphite, so that it has a silica to carbon ratio of less than about 1:1. The material is then compacted and carbothermally reduced using the conditions described in Example 5. Silicon carbide is formed having a purity of about 94.4 weight percent. An x-ray diffraction spectrum (intensity vs. 2 theta angle) of the product is shown in FIG. 8. The peaks 81, 82, and 83, correspond to diffraction angles that are representative of silicon carbide having traces of cristobalite.

Example 9

Example 9 is prepared using the method of Example 8, except the RHA is acid milled, then leached, then silica extracted, and then leached prior to mixing with the glucose binder to form a cylinder having a silica to carbon ratio of less than about 1:1. After reducing the silica in the EAF, micron sized particles of silicon carbide are formed having a purity greater than about 99.99 weight percent. The yield of silicon carbide is greater than about 90 percent.

Figure 7:
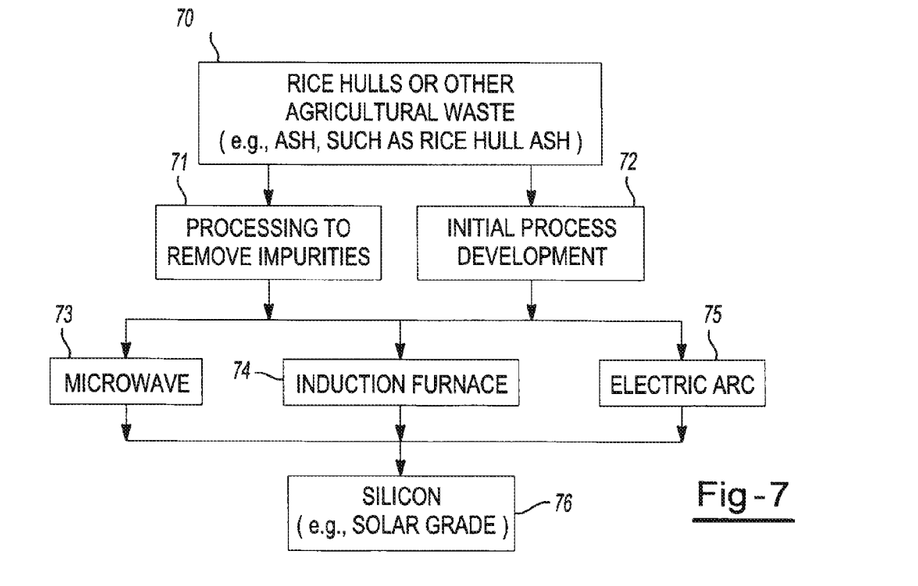
FIG. 7 is a flow chart that illustrates one embodiment of the present invention.

FIG. 7 is a flowchart illustrating several aspects of the present invention. Beginning with RH (e.g., RHA) or other AWPs, impurities are substantial reduced or removed. Once the impurities have been removed, the RH enters a plasma field, a microwave, an induction furnace, an electric arc, the like, or combinations thereof. In one aspect from the microwave, the induction furnace, the electric arc, the like, or any combination thereof, $Si_{pv}$ is recovered.

It should be understood that various ingredients or steps may be substituted, added or removed from the above formulations without departing from the scope of the present invention. Moreover, it is contemplated that the weight percentages of the above ingredients and the values of the properties listed may vary up to or greater than ±5 percent, ±10 percent, ±25 percent or ±50 percent of the values listed. For example, a value of 10±10 percent results in a range of 9 to 11.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

It should be appreciated that the above referenced aspects and examples are non-limiting as others exist within the scope of the present invention, as shown and described herein. For example, any of the above mentioned aspects or features of the invention may be combined to form other unique configurations, as described herein, demonstrated in the drawings, or otherwise.

The originally filed claims from the U.S. Provisional Patent Application are incorporated herein by reference. The invention described herein includes all combinations of the features, elements, and/or process steps described and used in the claims.

What is claimed is:

1. A method for providing high purity silicon comprising the steps of:
   providing an agricultural waste product having amorphous silica, carbon, and impurities;
   extracting from the agricultural waste product an amount of the impurities;
   changing the ratio of carbon to silica to form a cleaned agricultural waste product (AWPcl); and
   reducing the silica to photovoltaic silicon;
   wherein the agricultural waste product is a product of burning a raw agricultural waste product, and
   in the step of extracting the impurities, the impurities are extracted from the agricultural waste product with an aqueous acidic solution so as to form an extracted agricultural waste product.

2. The method of claim 1, wherein, in the providing step, the agricultural waste product is ground, sieved, sedimented, Or any combination thereof so as to increase exposure to pores of the agricultural waste product.

3. The method of claim 1, wherein, in the step of providing the agricultural waste product, the agricultural waste product has a molar ratio of carbon to silica that ranges from about 5:95 to about 60:40.

4. The method of claim 1, wherein, in the step of providing the agricultural waste product, the agricultural waste product includes at least about 40 percent by weight silica.

5. The method of claim 1, wherein the aqueous acidic solution includes sulfuric acid, hydrochloric acid, methanesulfonic acid, trifluormethanesulfonic acid, acetic acid, formic acid, propanoic acid, or any combination thereof.

6. The method of claim 1, wherein the aqueous acidic solution is hydrochloric acid in water and has an acid concentration of at least 5 percent by weight of the aqueous acidic solution, wherein the step of extracting impurities includes the steps of heating the agricultural waste product to a temperature from about 30° C. to about 120° C. in the aqueous acidic solution and then rinsing the agricultural waste product at least once with water, wherein the water is distilled water, electronic grade water, or both.

7. The method of claim 1, wherein, in the step of extracting impurities, the agricultural waste product is heated for a heating time from about 0.5 hours to about 24 hours.

8. The method of claim 1, wherein, the changing the ratio step, the extracted agricultural waste product is reacted with a tetraalkylammonium hydroxide.

9. The method of claim 8, wherein the tetraalkylammonium hydroxide includes tetramethylammonium hydroxide, tetraethylammonium hydroxide, trimethyloctylammonium hydroxide, trimethylethanolammonium hydroxide, trimethylpropanolammonium hydroxide, or any combination thereof and the extracted agricultural waste product is reacted with a tetraalkylammonium hydroxide for a reaction time from about 0.5 hours to about 30 hours.

10. The method of claim 1, wherein,
    in the changing the ratio step, a cleaned agricultural waste product (AWPcl) is formed having a ratio of carbon to silica that ranges from about 2:1 to about 10:1.

11. The method of claim 1, wherein the process includes a step of adding carbon black, graphite, or both to the cleaned agricultural waste product (AWPcl) to form an admixture, and a step of compacting the admixture wherein the compacted material has an electrical conductivity of at least about 0.1 S/cm.

12. The method of claim 11, wherein the process includes a step of adding silica before, after, or during the compacting step to reduce the carbon to silica ratio.

13. The method of claim 1, wherein the reducing step comprises heating the cleaned agricultural, waste product (AWPcl) in a furnace having an inert atmosphere, an air atmosphere, or a reducing atmosphere, at a temperature of at least 1300° C.

14. The method of claim 1, wherein the reducing step includes a step of recovering silane gas in a cold-trap, a step of purifying the silane gas by distillation, or both.

15. The method of claim 1, wherein the process includes a second application of the impurities extracting step wherein the cleaned agricultural waste product (AWPcl) is acid washed with an aqueous acid solution for at least about 0.5 hours and includes a water washing step of washing in electronic grade water to reduce or eliminate the impurities from the AWPcl.

16. The method of claim 15, wherein the process includes a compacting step after the second application of the impurities extracting step.

17. The method of claim 15, wherein after the second application of the impurities extracting step, the concentration of boron, phosphorus, aluminum, other transition metals, or any combination thereof, is less than about 100 ppm by weight, based on the total weight of the AWPcl.

18. A method for producing high purity silicon comprising the steps of:
provi­ding an agricultural waste product that includes amorphous silica, carbon and impurities, the agricultural waste product having a ratio of carbon to silica ranging from about 5:95 to about 60:40;
extracting from the agricultural waste product an amount of the impurities using one or more applications of an aqueous acidic solution so as to form an extracted agricultural waste product, wherein the one or more applications includes a first application of the aqueous acidic solution having hydrochloric acid in distilled water;
changing the ratio of carbon to silica by contacting the extracted agricultural waste product with an ammonium hydroxide to increase the carbon to silica ratio to a ratio that ranges from about 1:1 to about 5:1 so as to form a cleaned agricultural waste product, AWPcl, while at least partially extracting silica as an ammonium silicate;
re-crystallizing the ammonium silicate in electronic grade water, electronic grade alcohol, or both;
applying a second application of an aqueous acidic solution to the AWPcl after the step of contacting with an ammonium hydroxide to further reduce or eliminate impurities from the AWPcl;
combining electronic grade colloidal silica and the AWPcl;
compacting the combined electronic grade colloidal silica and AWPcl; and
reducing the compacted electronic grade colloidal silica and AWPcl so as to form photovoltaic grade silicon by thermal heating, plasma heating, or a combination of both at a temperature of at least about 1300° C.

19. A method for producing high purity silicon comprising the steps of:
providing rice hull ash that includes amorphous silica, carbon and impurities, the rice hull ash having a ratio of carbon to silica ranging from about 5:95 to about 60:40;
extracting from the rice hull ash an amount of the impurities in an aqueous acidic solution of hydrochloric acid so as to form an extracted rice hush ash;
changing the ratio of carbon to silica by reacting the extracted rice hull ash with a tetraalkylammonium hydroxide to increase the carbon to silica ratio to a ratio that ranges from about 1:1 to about 5:1 so as to form a cleaned rice hull ash, RHAcl; and
carbothermally reducing the silica from the RHAcl to photovoltaic grade silicon by heating in an inert atmosphere at a temperature of at least about 1300° C.

* * * * *